April 28, 1953 E. M. SMITH 2,636,729
TAPE HANDLING DEVICE
Filed May 25, 1949
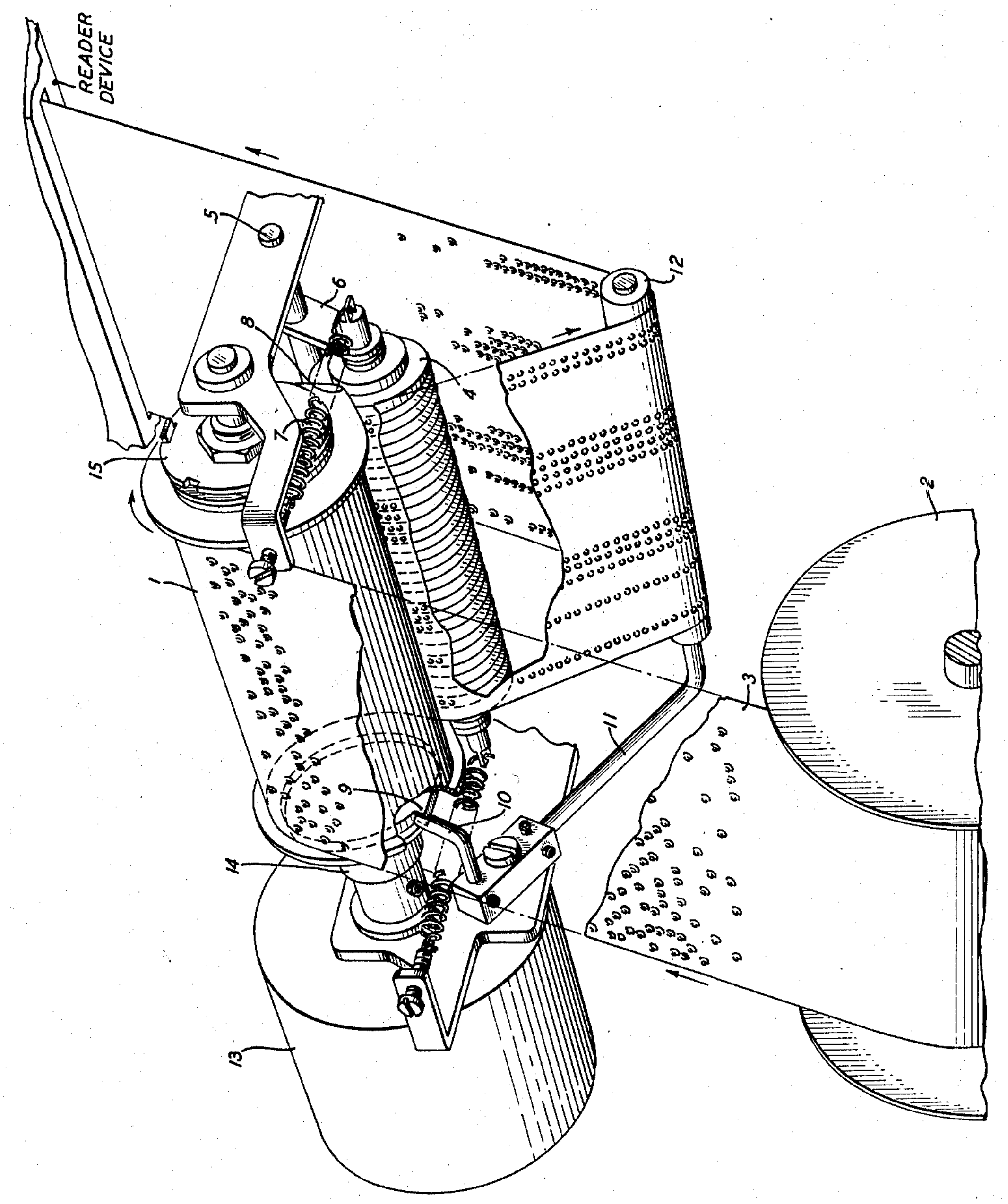
INVENTOR
E. M. SMITH
BY J. W. Schmied
ATTORNEY Patented Apr. 28, 1953 2,636,729

UNITED STATES PATENT OFFICE 2,636,729

TAPE HANDLING DEVICE

Edward M. Smith, Montclair, N. J., assignor to Bell Telephone Laboratories, Incorporated, New York, N. Y., a corporation of New York Application May 25, 1949, Serial No. 95,351

4 Claims. (Cl. 271—2.4)

This invention relates to tape handling devices and particularly to means for feeding perforated tape into devices where pins will be inserted into the perforations thereof.

The object of the invention is to protect the tape from strain applied thereto and to avoid mutilation of the perforations and consequent erratic and false operation of a tape reader device. In an automatic accounting system where the various accounting steps are taken by reading items of information from a perforated tape and preparing other output tapes as the result of an accounting step, it is important that no errors in accounting be made from any cause including mutilation of the tapes employed. In such a system and as disclosed herein a tape having twenty-eight perforating positions is employed in the normal operation of which there may be a maximum of twenty-three perforations in a transverse line.

An exemplary embodiment of the invention consists of a power driven drum to move a perforated tape from a storage bin to a reading device. Pressing the tape against the drum is a grooved roller, the apexes of said grooves passing between the perforations in the tape. A lever having a roller at one end is so positioned that the other end of said lever is normally in the path of a first cam connected to said drum. The tape passes around the roller and when the tape becomes too taut the lever is caused to be pivoted out of the path of said first cam and said drum is allowed to rotate at least one revolution. A second cam upon said drum repels said grooved roller from close contact with the drum and allows the tape to laterally adjust itself and also to pull itself around the drum substantially free of surface friction, if the tape is too taut.

A feature of the invention is the grooved roller which holds the tape against the drum without damaging the perforations in said tape.

A further feature of the invention is the cam on said drum which lifts the grooved roller from contact with the drum and allows the tape to readjust itself laterally with respect to the grooves of said grooved roller.

Another feature of the invention is the coaction between the cam on the drum which disengages the grooved roller from the drum and the cam which engages the aforementioned lever to stop the rotation of said drum. These two functions occur simultaneously so that the drum is stationary when the grooved roller is lifted from contact with the drum.

These and other features and objects of the invention will be more readily understood from the following detailed description of the drawings.

The figure shows a perspective view of the invention.

The storage bin 2 is in the form of a large reel which, although of mechanically light material and construction, nevertheless has a considerable moment of inertia due to mere size and the amount of tape stored thereon. It is to be noted that when the reel is full and is placed in motion by a pull on the outer radius thereof, the inertia is comparatively great due to the amount of tape stored and when the reel is nearly empty, and therefore, light in weight, the inertia is comparatively great due to the small radius on which the pull is exerted. The tape employed is perforated and, therefore, may be mechanically weakened by a transverse line of such perforations so that should an attempt be made to move the tape from the storage reel by means of the reader pins the tape might be torn or the perforations mutilated. Stated otherwise, it is necessary that as the tape moves into the reading position in the reading device there must be no drag exerted on it, particularly in the amount which would be entailed in pulling it from the large storage reel. Therefore, a feeding mechanism is provided under the control of a taut tape device whereby when the slack between the power-driven drum and the reader reaches a minimum point the feeding mechanism will operate to provide additional slack.

The tape 3 is in the form of a strip of paper and the perforations are in the form of holes pierced in the paper by perforating pins rather than cut in the paper by punches so that the underside of the tape is burred. Therefore, the roller 4 over which the tape must pass is not in the form of a smooth cylindrical surface but rather is in the form of a plurality of rings of triangular cross-section, like the threads of a screw, so that contact with the paper is made along tracks between the longitudinal rows of burrs of the perforations. It is to be noted that if a non-perforated tape is to be used it will not be necessary that roller 4 be grooved. A smooth surface would be satisfactory.

In the exemplary embodiment of the invention being described here, however, the smooth side of the tape 3 is in contact with the power-driven drum 1 and the grooved roller 4 is then used on the other side of the tape to press the tape firmly against this drum. The drum 1 is provided with a camming arrangement 8 to lift the grooved roller 4 away from such position when the power-driven drum reaches its position of rest. This arrangement is made in order to provide an opportunity for the tape to adjust itself laterally while slack so that the burrs of the perforations will not be crushed.

A taut tape switch or device, hereinafter to be described controls clutches 14 and 15 interposed between the source of power for the reader and the drum and means are provided so that the drum 1 when set in motion will in each case complete a full 360-degree revolution before being declutched. By means of this arrangement a cam 8 associated with the said drum will lift the grooved roller away from the surface thereof during the periods of rest of the said drum and when there is considerable slack in the tape so that the tape may become properly adjusted.

The taut tape switch or device is comprised of roller 12, lever 11, pawl 10 and cam 9. When the tape becomes taut between roller 12 and the reader device, roller 12 is raised, thus disengaging pawl 10 from cam 9 and allowing the drum 1 to be rotated by motor 13. The drum will rotate until the tape becomes lax again. This usually takes no more than one revolution of the drum, at which time the tape, no longer being taut, allows roller 12 to drop back down and thereby causing pawl 10 to engage cam 9 again, stopping the rotation of drum 1. A friction clutch 14 and 15 allows motor 13 to continue running. Cam 8 is now in contact with grooved roller 4 and has disengaged roller 4 from contact with drum 1, thus allowing the tape to adjust itself laterally so that the apexes of the grooves of roller 4 will fall between the columns of perforations in the tape. As the tape is drawn into the reader device, roller 12 is raised again allowing the drum 1 to make another revolution wherein the cycle repeats itself.

It should be noted that except when cam 8 is in contact with grooved roller 4, spring means 7 in cooperation with lever 6, which is pivoted at element 5, maintains a force on roller 4 which causes it to press against drum 1. This provides traction for tape 3 with drum 1.

It is to be understood that the form of this invention, herewith shown and described, is to be taken as a preferred example of the same, and that various changes in the shape, size and arrangement of parts may be resorted to, without departing from the spirit or scope of the invention.

What is claimed is:

1. In a tape handling mechanism, a perforated tape, a drum for advancing said tape, a source of power, a friction clutch connecting said source of power to said drum, first means normally preventing the rotation of said drum by said source of power, a taut tape switch operative when said tape becomes taut for disabling said first means, a roller for pressing said tape against the face of said drum, and a cam integral with said drum and in fixed relation with said first means for holding said roller away from said drum only while said first means is preventing the rotation of said drum.

2. In a tape handling mechanism, a perforated tape, a drum for advancing said tape, a source of power frictionally connected to said drum for rotating said drum, a detent normally engaging said drum for preventing the rotation of said drum, a roller for pressing said tape against the face of said drum, a cam on said drum operative only while the rotation of said drum is prevented by said detent for holding said roller away from said drum, and a taut tape switch operative when said tape becomes taut for disengaging said detent from said drum whereby said drum is permitted to rotate and whereby said cam is disabled to hold said roller away from said drum.

3. In a tape handling mechanism, a perforated tape, a drum for advancing said tape, a source of power frictionally connected to said drum for rotating said drum, a notched ring integral with said drum, a detent normally engaging said notched ring for preventing the rotation of said drum by said source of power, a roller, spring means forcing said roller toward said drum, a cam on said drum operative only while the rotation of said drum is prevented by the engagement of said detent with said notched ring for holding said roller away from said drum, and a taut tape switch operative when said tape becomes taut for disengaging said detent from said drum whereby said drum is permitted to rotate, said cam being disabled by the rotation of said drum to hold said roller away from said drum whereby said roller is forced by said spring means toward said drum to hold said tape against the face of said drum while said drum is rotating.

4. In a tape handling mechanism, a perforated tape having its perforations arranged in columns, a drum for advancing said tape, a source of power frictionally connected to said drum for rotating said drum, a notched ring integral with said drum, a detent normally engaging said notched ring for preventing the rotation of said drum by said source of power, a roller having a plurality of raised circumferential rings spaced longitudinally on said drum to contact said tape between said columns of perforations, spring means forcing said roller toward said drum, a cam on said drum operative only while the rotation of said drum is prevented by the engagement of said detent with said notched ring for holding said roller away from said drum against the force exerted by said spring means, and a taut tape switch operative when said tape becomes taut for disengaging said detent from said drum whereby said drum is permitted to rotate in one or more revolutions of 360 degrees, said cam being disabled by the rotation of said drum to hold said roller away from said drum whereby said roller is forced by said spring means toward said drum to hold said tape against the face of said drum while said drum is rotating.

EDWARD M. SMITH.

References Cited in the file of this patent

UNITED STATES PATENTS

| Number | Name | Date |
|---|---|---|
| 831,437 | Holton | Sept. 18, 1906 |
| 1,106,067 | Wood | Aug. 4, 1914 |
| 1,128,801 | Marshall | Feb. 16, 1915 |
| 1,140,254 | Cooper | May 18, 1915 |
| 1,386,573 | Martin | Aug. 2, 1921 |
| 1,408,894 | La Ganke | Mar. 7, 1922 |
| 1,437,949 | Sherman et al. | Dec. 5, 1922 |
| 1,637,658 | Rose | Aug. 2, 1927 |
| 1,703,677 | McDonald | Feb. 26, 1929 |
| 1,801,739 | Gustafson | Apr. 21, 1931 |
| 2,118,627 | Steiner | May 24, 1938 |
| 2,297,128 | Benson | Sept. 29, 1942 |
| 2,333,065 | Wyrick | Oct. 26, 1943 |
| 2,355,668 | Morse | Aug. 15, 1944 |